United States Patent [19]

Miki et al.

[11] Patent Number: 5,143,345
[45] Date of Patent: Sep. 1, 1992

[54] TWO-WAY ELECTROMAGNETIC VALVE

[75] Inventors: Nobuaki Miki, Kariya; Kiyohiko Sugiura, Hekinan; Takeshi Nasu; Masayuki Sugiura, both of Anjo; Masao Saito, Nishio, all of Japan

[73] Assignee: Aisin Aw Co., Ltd., Japan

[21] Appl. No.: 633,450

[22] Filed: Dec. 28, 1990

[30] Foreign Application Priority Data

Dec. 28, 1989 [JP] Japan ................................ 1-338192

[51] Int. Cl.5 .............................................. F16K 31/06
[52] U.S. Cl. ........................... 251/129.02; 251/129.14;
251/129.15
[58] Field of Search ...................... 137/596.17, 625.65;
251/129.02, 129.14, 129.15

[56] References Cited

U.S. PATENT DOCUMENTS 4,509,716  4/1985  Barber et al. ............... 251/129.15 X
4,783,049  11/1988  Northman et al. ............. 251/129.14

FOREIGN PATENT DOCUMENTS 2-248784  10/1990  Japan ............................... 251/129.14

Primary Examiner—Gerald A. Michalsky
Attorney, Agent, or Firm—Lorusso & Loud

[57] ABSTRACT

A two-way electromagnet has an input port and a discharge port at opposing ends of a flow passage which is opened or closed by the drive of an electromagnet. The two-way electromagnetic valve operating portion or module includes an electromagnetic coil, a plunger adapted to be driven by the electromagnetic coil, a yoke fitted around a sleeve and a push rod fixed in the plunger. The valve portion or module includes an outer valve body in which the input port and a valve seat are formed, an inner valve body formed with a bore for receiving the leading end of the push rod therethrough and a passage communicating with the discharge port. The valve member is a ball arranged between the valve seat of the outer valve body and the inner valve body. The push rod is moved forward when the electromagnetic coil is deenergized to bring the ball into abutment against the valve seat to thereby close the input port. When the electromagnetic coil is energized, the push rod is moved backward to allow the ball to move out of the valve seat thereby opening the input port and establishing communication between the input port and the discharge port. Alternatively, the valve seat may be formed in the inner valve body.

4 Claims, 4 Drawing Sheets

TWO-WAY ELECTROMAGNETIC VALVE

BACKGROUND OF THE INVENTION

1. Field of the Invention

The present invention relates to a two-way electromagnetic valve and, more particularly, to a two-way electromagnetic valve which has a ball displaced by the drive of electromagnetic means in response to an electric signal to permit or cut-off flow therethrough.

2. Description of the Prior Art

The prior art is exemplified in FIGS. 8 and 9. A normally-closed two-way electromagnetic valve is constructed, as shown in FIG. 8, of a casing 1, a core 2, an electromagnetic coil 4 wound on a bobbin 3, a terminal 5 mounted in resin molding 9, a yoke 6, a coil spring 7 and a plunger 8. The normally-closed type two-way electromagnetic valve has, in its valve portion, a base 10, formed with an input port 12 and a discharge port 13, and a ball 11 adapted to seat in the valve seat of base 10 by the forward movement of the plunger 8.

On the other hand, as shown in FIG. 9, a normally-open two-way electromagnetic valve is constructed of a casing 21, an electromagnetic coil 24 wound on a bobbin 23, a terminal 25 set in a resin molding, a yoke 22 and a plunger 27. The normally-open two-way electromagnetic valve has its valve portion including a slender base 30 formed with an input port 32 extending deeply into the electromagnet portion and a ball adapted to seat in the valve seat of the base 30 by the forward movement of the plunger 27. Moreover, the casing 21 is formed with a discharge port 33 opposite input port 32.

Comparing FIGS. 8 and 9 it can be seen that in the prior art the normally-closed type two-way electromagnetic valve and the normally-open type two-way electromagnetic valve are constructed so differently that they are assembled of almost entirely different parts.

In other words, since parts are not shared between the valves of the two types, there arise problems in that the production cost is high and many parts have to be managed.

SUMMARY OF THE INVENTION

An object of the present invention is to solve the above-specified problems and to provide a two-way electromagnetic valve which has an electromagnet operator which mates with either a normally-open or a normally-closed valve portion.

Another object of the present invention is to provide a two-way electromagnetic valve which has parts interchangeable with those of a three-way electromagnetic valve.

In order to achieve the above-specified objects, according to the present invention, there is provided a two-way electromagnetic valve which has an input port and a discharge port in communication via a flow passage which is opened or closed by the drive of an electromagnet. The valve of the invention includes an electromagnetic coil, a plunger adapted to be driven by said electromagnetic coil, a yoke fitted around a sleeve, a push rod fixed to the plunger, an outer valve body in which the input port is formed, with a valve seat around the input port, and an inner valve body formed with a bore for receiving the leading end of the push rod and a passage communicating with the discharge port. The valve contains a ball, situated between the valve seat of the outer valve body and the inner valve body, which ball is engaged by the push rod and is thereby moved forward when the electromagnetic coil is deenergized. That forward movement brings the ball into abutment against the valve seat thereby closing the input port. The push rod is moved backward (withdrawn) when the electromagnetic coil is energized, to allow the ball to unseat from the valve seat to thereby open the input port and establish fluid communication between the input port and the discharge port.

In a second embodiment of the present invention, the two-way electromagnetic valve includes an electromagnetic coil, a plunger driven by the electromagnetic coil, a yoke fitted around a sleeve, a push rod fixed to the plunger, an outer valve body formed with an input port, an inner valve body formed with a bore for receiving the leading end of the push rod and a valve seat surrounding the bore. A ball is arranged between the outer valve body and the valve seat of the inner valve body. The push rod is moved forward when the electromagnetic coil is deenergized to push the ball out of the valve seat to thereby open the input port and establish fluid communication with said discharge port. The push rod is moved backward when the electromagnetic coil is energized to allow the ball to seat in the valve seat to thereby close the input port.

According to the present invention, the electromagnet operator is a unit including the plunger driven by the electromagnetic coil, a sleeve for guiding the plunger, the yoke fitted around the sleeve and the push rod fixed in the plunger. The electromagnetic unit is coupled to the valve portion which holds the ball interposed between the inner and outer valve bodies to open and close the flow passage by the drive of the plunger and push rod.

Thus, the electromagnet operator unit can be interchanged with various valve unit modules including normally-closed and normally-open types.

Moreover, the two-way electromagnetic valves of the present invention also have parts which are interchangeable with parts of a three-way electromagnetic valve.

BRIEF DESCRIPTION OF THE DRAWINGS

The foregoing and other objects and features of the present invention will become apparent from the following description to be made with reference to the accompanying drawings, in which.

DESCRIPTION OF THE PREFERRED EMBODIMENTS

Various preferred embodiments of the present invention will be described in detail with reference to the accompanying drawings.

Figure 1:
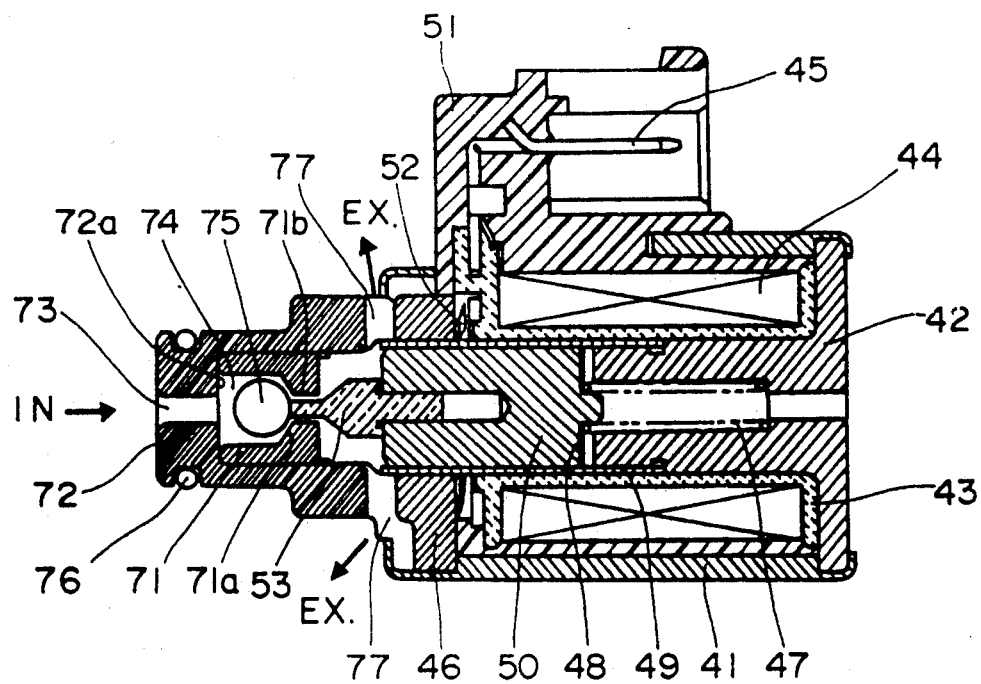
FIG. 1 is a cross-sectional view of a normally-closed type two-way electromagnetic valve embodiment of the present invention in its closed position.
Figure 2:
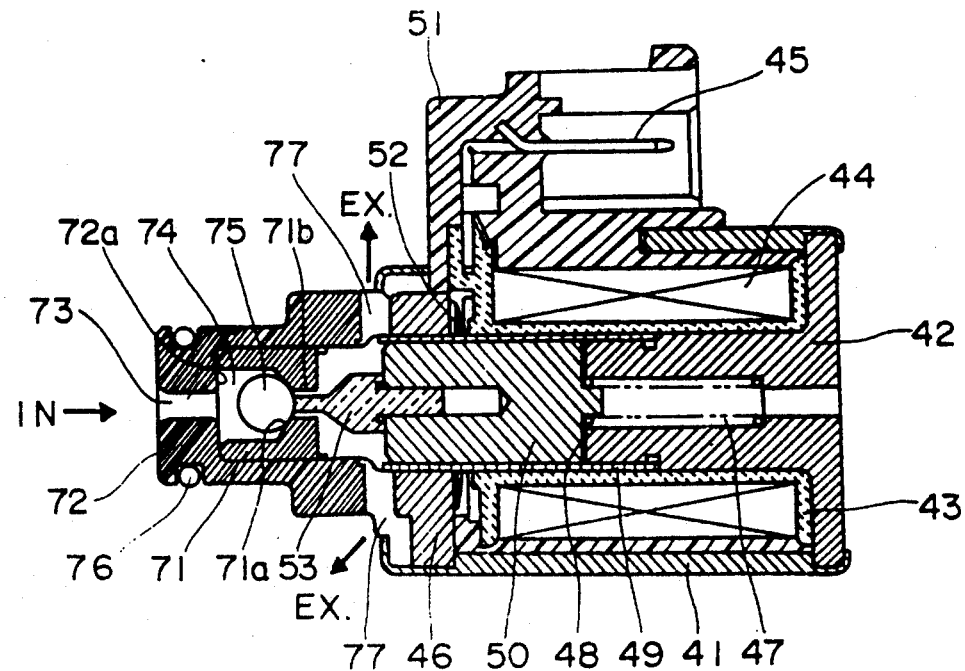
FIG. 2 is a cross-sectional view of the normally-closed two-way electromagnetic valve of FIG. 1 in its open position.
Figure 3:
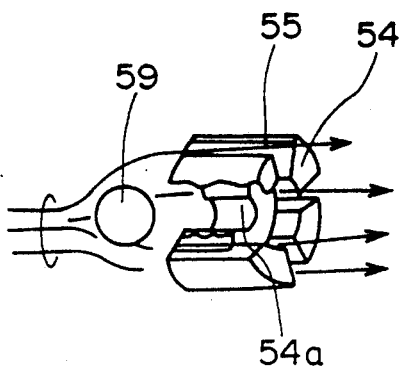
FIG. 3 is a partially broken-away perspective view showing the inner valve body of the normally-closed two-way electromagnetic valve of FIG. 1.
Figure 4:
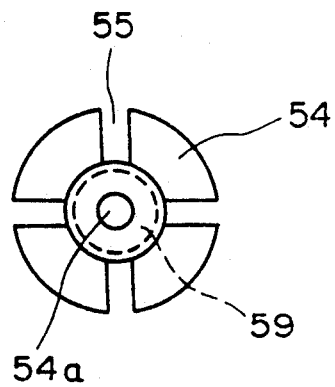
FIG. 4 is a left-hand side elevation of FIG. 3.
Figure 5:
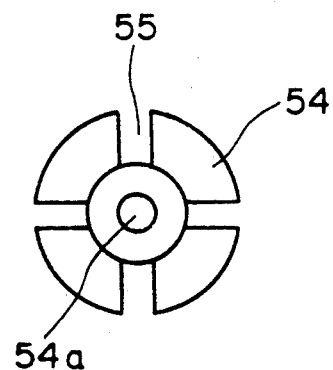
FIG. 5 is a right-hand side elevation of FIG. 3.

As seen in the embodiment of FIGS. 1 and 2, the modular electromagnetic operator of the present invention includes a casing 41, a core 42, an electromagnetic coil 44 wound on a bobbin 43, a terminal 45 supported on the bobbin 43 and fixed by means of a resin molding 51, a yoke 46, a coil spring 47 for moving a plunger 50 forward, a spacer 48 for providing a seat for the coil spring 47, a sleeve 49 for guiding the plunger 50, a web washer 52 and a push rod 53 made of a non-magnetic material and press-fitted in a recess 50a formed in the front end of the plunger 50. The push rod 53 is made of the non-magnetic material to protect the valve portion against the magnetic flux.

The electromagnetic operator module of FIGS. 1 and 2 is also adaptable to a three-way electromagnetic valve.

FIGS. 1 and 2 also show the valve unit, portion or module, which is a normally-closed valve and which includes an inner valve body 54 formed with a bore 54a for receiving the leading end of the push rod 53 and a passage 55 leading to a discharge port 61. An outer valve body has a recess with a step for receiving the inner valve body 54 therein, an input port 57, a valve seat 56a and a discharge port 61 in its base. A ball 59 is arranged between the valve seat 56a and the inner valve body 54 for engagement by the leading end of the push rod 53. Reference numeral 60 designates an O-ring.

The valve module is coupled with the aforementioned electromagnetic means. Specifically, the base portion of the outer valve body 56 is held against the yoke 46 by the casing 41.

In the embodiment of FIG. 1, the plunger 50 is pushed forward by the urging force of the coil spring 47 when the electromagnetic coil 44 is deenergized, so that the ball 59 is pushed into the valve seat 56a of the outer valve body 56 by the action of the push rod 53 fixed in the plunger 50. As a result, the input port 57 is closed to shut off the passage to the discharge port 61.

When the electromagnetic coil 44 is energized, the plunger 50 is pulled backward against the force of the coil spring 47, as shown in FIG. 2, so that the push rod 53 fixed in the plunger 50 moves backward to allow the ball 59 out of the valve seat 56a of the outer valve body 56. As a result, the input port 57 is opened to establish communication with the discharge port 61.

Figure 6:
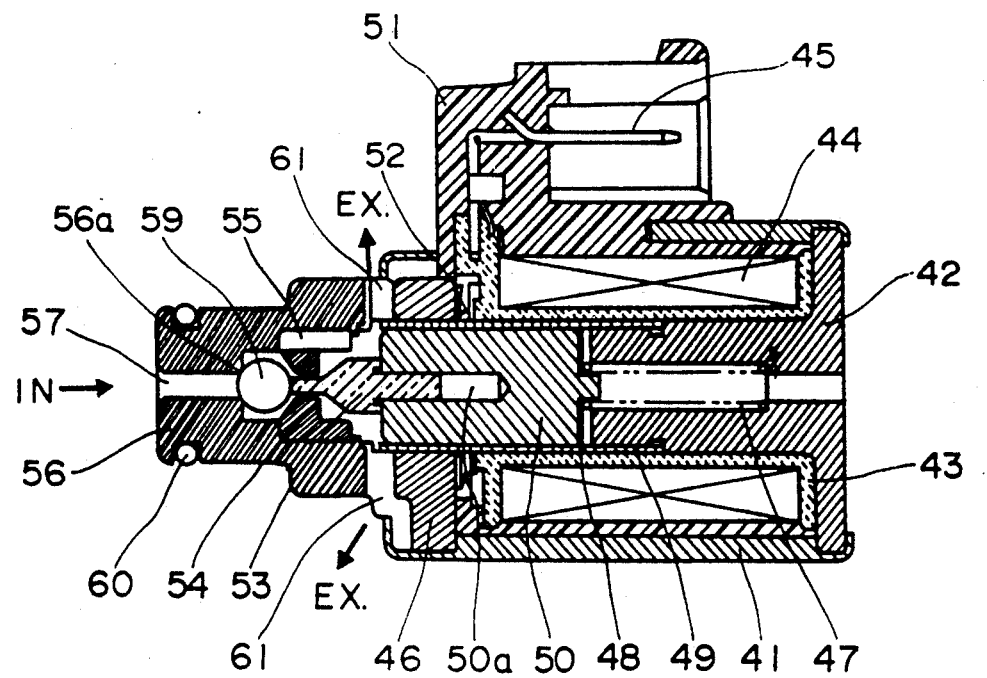
FIG. 6 is a cross-sectional view of a normally-open type two-way electromagnetic valve, according to another embodiment of the present invention, in its open position.
Figure 7:
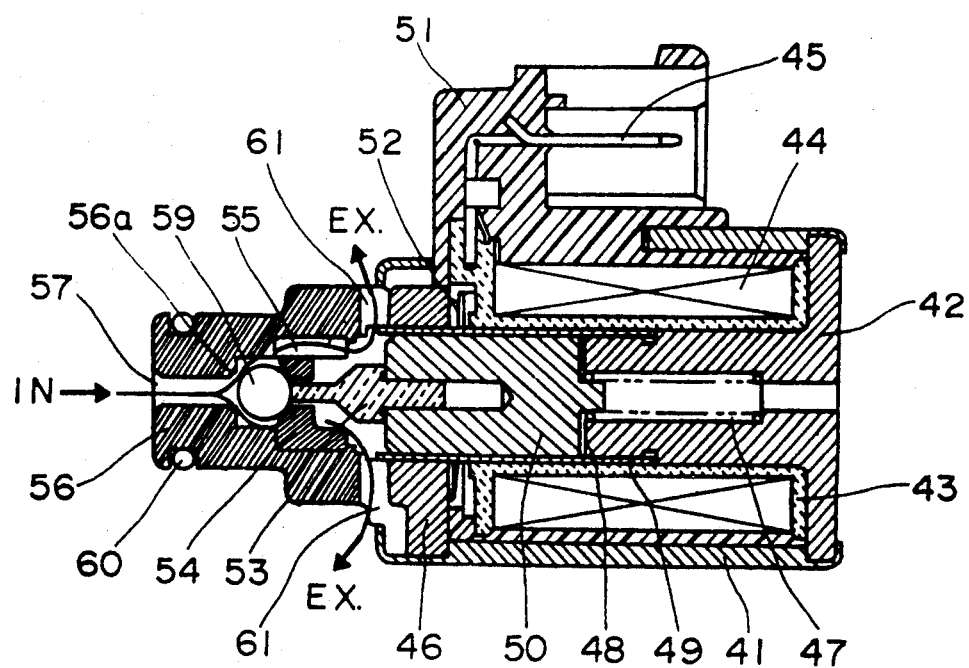
FIG. 7 is a cross-sectional view of the normally-open two-way electromagnetic valve of FIG. 1 in its closed position.
Figure 8:
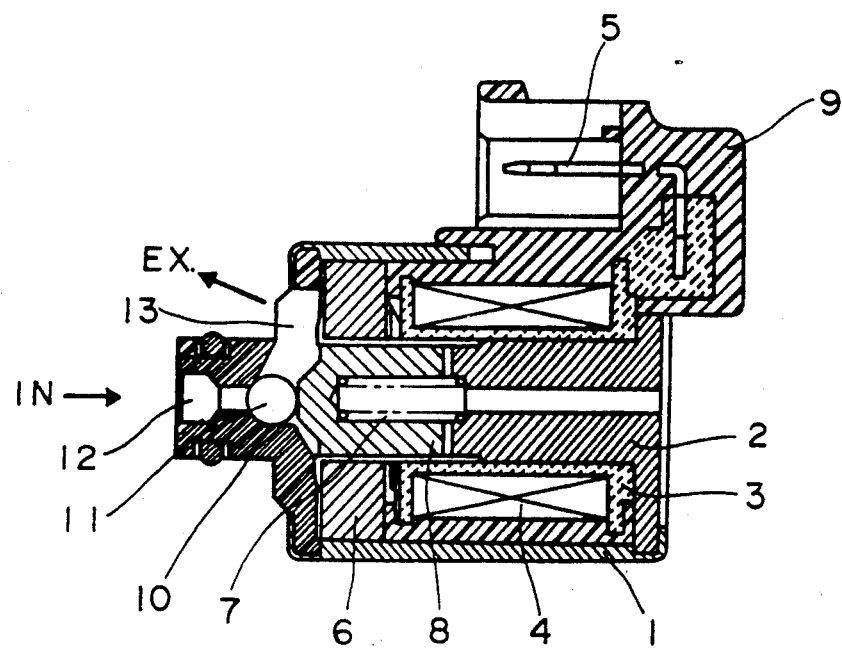
FIG. 8 is a cross-sectional view of a normally-closed two-way electromagnetic valve of the prior art in its closed position.
Figure 9:
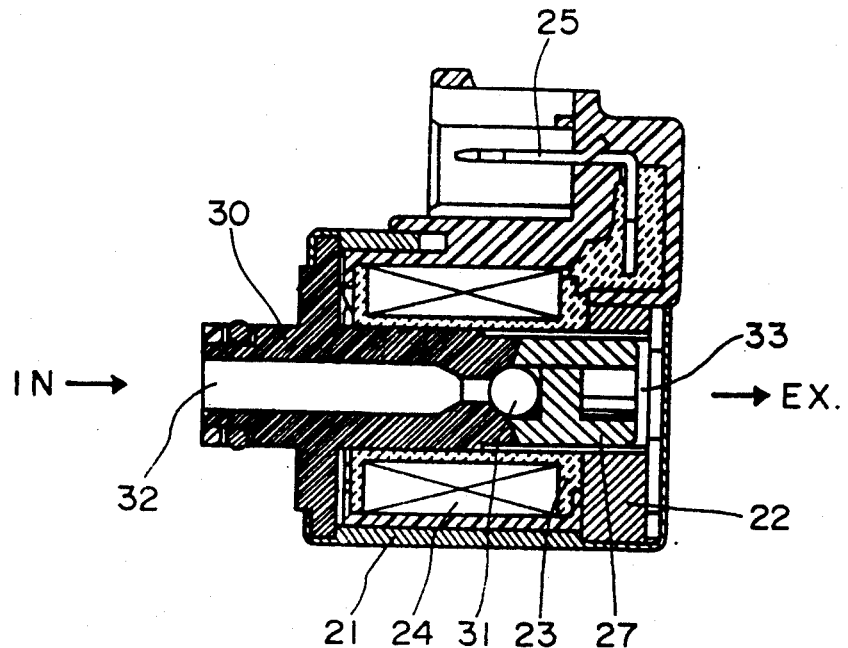
FIG. 9 is a cross-sectional view of the prior art normally-open two-way electromagnetic valve of the prior art in its closed position.

FIG. 6 is a section which shows a normally-open type two-way electromagnetic valve according to another embodiment of the present invention in its open state and FIG. 7 shows the same valve closed.

The electromagnetic operator unit or module of the normally open valve of FIGS. 6 and 7 has a structure similar to that of the aforementioned normally-closed type two-way electromagnetic valve. In other words, the electromagnetic operators are interchangeable.

The valve portion of the embodiment of FIGS. 6 and 7 has an outer valve body 72, an inner valve body 71 and a ball 75. The outer valve body 72 is formed with, not only an input port 73 and a step 72a, but also a discharge port 77 at its base. On the other hand, the inner valve body 71 is fitted with its leading end abutting against the step 72a. This inner valve body 71 is formed with a recess 74 for retaining the ball 75, a valve seat 71a and an axial bore 71b for receiving the leading end of the push rod 53. Numeral 76 designates an O-ring.

The above-described portion is assembled with the aforementioned electromagnetic operator. Specifically, the base portion of the outer valve body 72 is held against the yoke 46 by the casing 41.

With the above-described structure of the embodiment of FIG. 6, the plunder 50 is pushed forward by the urging force of the coil spring 47 when the electromagnetic coil 44 is deenergized, so that the ball 75 is pushed out of the valve seat 71a of the inner valve body 71 by the action of the push rod 53 fixed in the plunger 50. As a result, communication is established from the input port 73 through the bore 71b to the discharge port 77.

When the electromagnetic coil 44 is energized, on the other hand, the plunger 50 is drawn backward against the force of the coil spring 47, as shown in FIG. 7, so that the push rod 53 fixed in the plunger 50 is also moved backward. Simultaneously with this, the ball 76 is pushed into the valve seat 71a of the inner valve body 71 by the oil entering the input port 73. As a result, the passage to the discharge port 77 is closed.

With the structures thus far described:

(1) Two-way electromagnetic valves of both the normally-closed and normally-open types can be constructed without any change in the electromagnetic operator by changing the outer and inner valve bodies only of the valve portion. In accordance with the present invention, the oil passages through the valve body, i.e. the input port and the discharge port, are positioned the same in the two types so that they can be easily assembled with the hydraulic circuit; and (2) The structures of the two-way electromagnetic valves are designed so that they can be commonly used for producing a three-way electromagnetic valve. As a result, substitution of a three-way electromagnetic valve for a two-way electromagnetic valve can be easily effected by changing the valve portion only.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A two-way electromagnetic valve comprising: an electromagnetic operator comprising:

an electromagnetic coil defining a central axial opening;

means for supplying current to the coil to energize the coil;

a core provided in the central axial opening for supporting the coil;

a sleeve extending at least part way into the central axial opening and mounted around the core;

a yoke fitted around one end of the sleeve; and a plunger provided slidably within the sleeve for reciprocating axial motion responsive to the energization of the coil; and a valve portion comprising:

an inlet port;

an outlet port;

an outer valve body having an axial recess and having the inlet port formed therein in fluid communication with said recess;

an inner valve body closing said recess and having an axial bore opening to said recess for receiving said plunger, a valve seat around the axial bore and fluid passage means providing fluid communication between said axial bore and said outlet port; and a ball mounted in said recess between said valve seat of said inner valve body and said outer valve body for engagement by said plunger whereby said plunger moves forward, responsive to deenergization of said coil, to dislodge said ball from said valve seat and thereby permit fluid flow through the valve and moves rearward, responsive to energization of said coil, to allow said ball to lodge in said valve seat thereby stopping fluid flow through the valve.

2. The two-way electromagnetic valve of claim 1, wherein said plunger has a section of a non-magnetic material which extends through said axial bore for engagement with said ball.

3. The two-way electromagnetic valve of claim 1, wherein said inner valve body is mounted within said recess.

4. A two-way electromagnetic valve comprising: an electromagnetic operator comprising:

an electromagnetic coil defining a central axial opening;

means for supplying current to the coil to energize the coil;

a core provided in the central axial opening for supporting the coil;

a sleeve extending at least part way into the central axial opening and mounted around the core;

a yoke fitted around one end of the sleeve; and a plunger provided slidably within the sleeve for reciprocating axial motion responsive to the energization of the coil; and a valve portion providing a valve seat and comprising:

an inlet port;

an outlet port;

an outer valve body having an axial recess, and having said inlet port formed therein, in fluid communication with said recess;

an inner valve body closing said recess and having an axial bore, opening to said recess, for receiving said plunger; and a ball mounted in said recess between said outer valve body and said inner valve body for engagement by said plunger by forward movement of said plunger, responsive to deenergization of said coil, and disengagement from said plunger by rearward movement of said plunger, whereby said ball seats and unseats from said valve seat thereby opening said inlet port for fluid flow in through said inlet port and out through said outlet port.

* * * * *